June 6, 1933.                 S. E. CHANCE                 1,913,069
                                HARROW
                         Filed Dec. 9, 1932          2 Sheets-Sheet 1
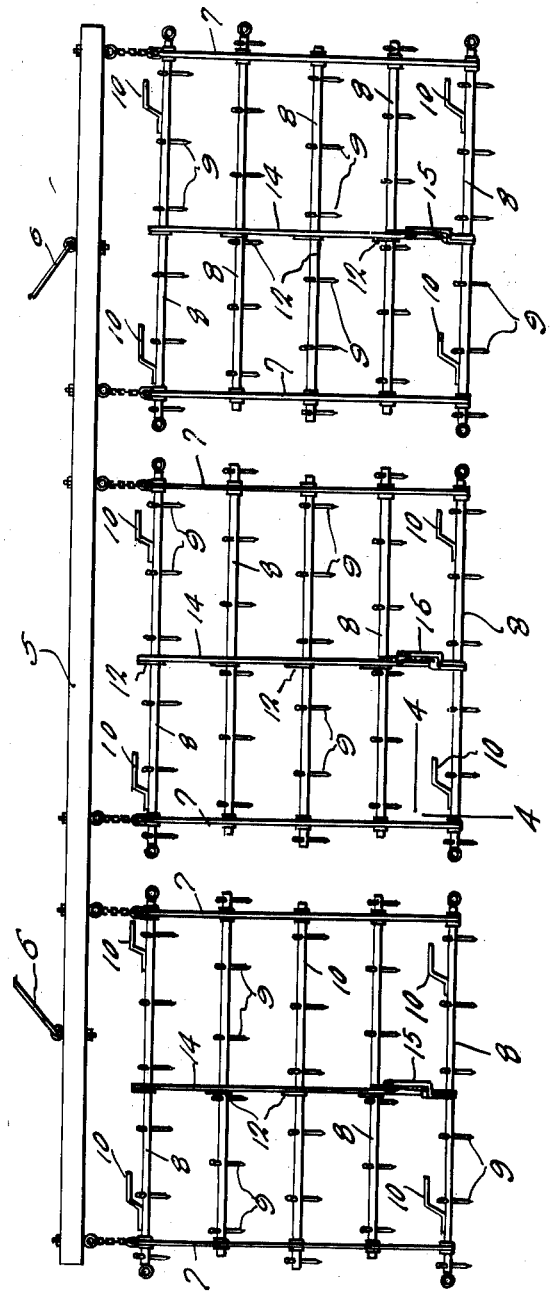
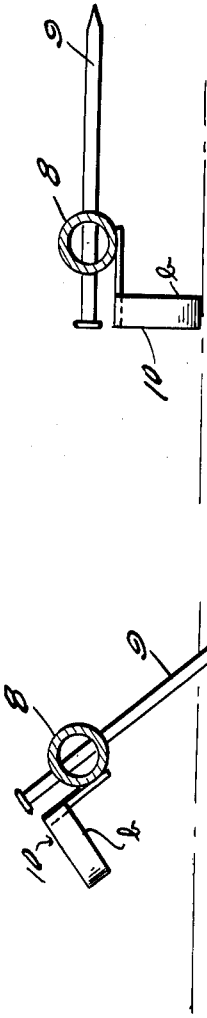
Inventor
S. E. Chance
By Clarence A. O'Brien
               Attorney June 6, 1933.   S. E. CHANCE   1,913,069
HARROW
Filed Dec. 9, 1932   2 Sheets-Sheet 2
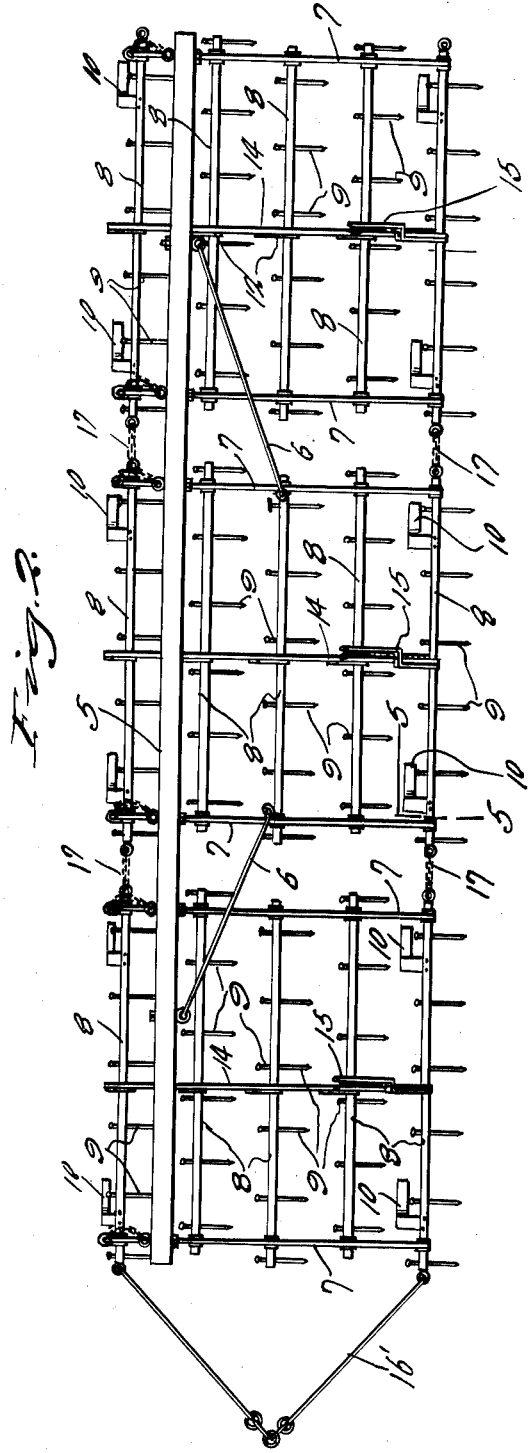
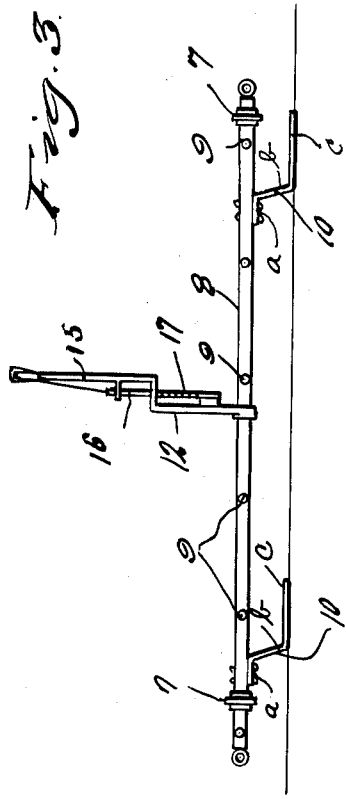
Inventor
S. E. Chance
By Clarence A. O'Brien
Attorney Patented June 6, 1933

1,913,069

UNITED STATES PATENT OFFICE

SAMMIE E. CHANCE, OF UNION MILLS, INDIANA

HARROW

Application filed December 9, 1932. Serial No. 646,529.

The present invention relates to a harrow and has for its prime object to provide a harrow construction wherein the same may be adjusted to inactive position when it is desired to move the harrow from one field to the other and for other similar purposes.

Another very important object of the invention resides in the provision of a harrow of this nature which is exceedingly simple in its construction, inexpensive to manufacture, easy and convenient to manipulate, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a top plan view of a harrow embodying the features of my invention showing the harrow teeth in active position.

Figure 2 is a similar view showing the teeth in inactive position.

Figure 3 is an edge view of one of the harrow sections, looking toward the bottom of Figure 2.

Figure 4 is a detail section taken substantially on the line 4—4 of Figure 1, and Figure 5 is a similar section taken substantially on the line 5—5 of Figure 2.

Referring to the drawings in detail it will be seen that numeral 5 denotes an elongated transverse draft bar to which suitable draft connection means 6 is attached. A plurality of drag harrow units are connected to the rear of the bar 5. As the units are identical in construction only one will be described in detail as this description will suffice for all. Each harrow unit comprises side frame members 7 disposed in spaced coextensive parallelism and having a plurality of bars 8 journalled therethrough to extend therebetween in spaced parallelism with each other. Through each bar 8 there is projected a plurality of spaced harrow teeth 9. On the front and rear bar 8 there are mounted two pairs, one pair on each bar, of runners 10. Each runner is of a substantially Z-shaped formation to comprise an end member $a$ secured to the bar, an intermediate portion $b$ and an end runner portion $c$. The intermediate portion $b$ is obliquely disposed in relation to the end members which are in substantial parallelism with each other. On the central portions of the bars 8 there are fixed to rise therefrom cranks 12 connected by a link rod 14 so as to swing in unison. A lever handle 15 is attached to the rearmost crank 12 and has a hand operated dog 16 to cooperate with a notched rack 17 secured on the two rearmost bars.

By proper manipulation of the lever 15 it will be seen that the harrow teeth may be placed in active position as indicated in Figures 1 and 4 with the runners raised. When it is desired to move the harrow from field to field or to move the same in inactive position, suitable draft means 16' is attached to one end of one of the units and the units are connected together by chains 17 and the levers 15 manipulated to place the runners in the position indicated in Figures 2 and 5.

It will be seen that these adjustments may be easily and quickly made and when the harrow is adjusted to the position shown in Figure 2 it may be easily slid along the ground from one field to the other or otherwise moved as may be desired.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a harrow having rotatably mounted teeth carrying bars, runners on some of said bars engaging the ground when the bars are moved to a position to place the teeth in inoperative position, each runner being of substantially Z shape and one of the outer limbs of the runner having a lateral extension, having its free end fastened to a bar.

In testimony whereof I affix my signature.

SAMMIE E. CHANCE.